United States Patent
Maehira

(10) Patent No.: US 8,083,319 B2
(45) Date of Patent: Dec. 27, 2011

(54) INKJET PRINTER

(75) Inventor: Hirotoshi Maehira, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 389 days.

(21) Appl. No.: 12/396,339

(22) Filed: Mar. 2, 2009

(65) Prior Publication Data

US 2009/0219318 A1    Sep. 3, 2009

(30) Foreign Application Priority Data

Feb. 29, 2008   (JP) .................. 2008-051338

(51) Int. Cl.
*B41J 2/15* (2006.01)
(52) U.S. Cl. ........................................... 347/41
(58) Field of Classification Search ................. 347/9, 12, 347/40–43
See application file for complete search history.

(56) References Cited

U.S. PATENT DOCUMENTS

| | | | |
|---|---|---|---|
| 6,106,101 A | 8/2000 | Suzuki | |
| 7,784,894 B2 * | 8/2010 | Maehira et al. | 347/16 |
| 2005/0219650 A1 | 10/2005 | Kondo et al. | |
| 2009/0284559 A1 * | 11/2009 | Sudo et al. | 347/14 |

FOREIGN PATENT DOCUMENTS

| | | |
|---|---|---|
| JP | H08-300737 A | 11/1996 |
| JP | H09-080375 A | 3/1997 |
| JP | H11-042769 A | 2/1999 |
| JP | 2000-218777 A | 8/2000 |
| JP | 2005-288838 A | 10/2005 |
| JP | 2007-160802 A | 6/2007 |

* cited by examiner

*Primary Examiner* — An Do

(74) *Attorney, Agent, or Firm* — Baker Botts L.L.P.

(57) ABSTRACT

The recording head is formed with ejection holes including first ejection holes and second ejection holes arranged in a first direction. A recording medium has invisible columns extending in the first direction and invisible rows extending in a second direction orthogonal to the first direction. The invisible columns have first invisible columns and second invisible columns alternately arranged in the second direction. The scanning unit performs a first scan and a second scan in the second direction. The controller prevents the recording head in the first scan from ejecting ink droplets from the first ejection holes onto the first invisible columns and from the second ejection holes onto the second invisible columns, and prevents the recording head in the second scan from ejecting ink droplets from the first ejection holes onto the second invisible columns and from the second ejection holes at the first invisible columns.

12 Claims, 9 Drawing Sheets

INKJET PRINTER

CROSS REFERENCE TO RELATED APPLICATION

This application claims priority from Japanese Patent Application No. 2008-051338 filed Feb. 29, 2008. The entire content of this application is incorporated herein by reference.

TECHNICAL FIELD

The present invention relates to an inkjet printer, a method for controlling a recording head, and a computer-readable storage medium storing a set of program instructions executable on the inkjet printer.

BACKGROUND

Color inkjet printers and other printers employing an inkjet system are well known in the art as a type of recording device. A typical inkjet printer has a recording head in which is formed a plurality of ejection holes arrayed in a sub-scanning direction. A main scan is performed by ejecting ink sequentially from the ejection holes onto a recording medium while moving the recording head in a main scanning direction. Through this main scan, the printer forms a plurality of rasters on the recording medium, where one raster is one line configured of a plurality of dots aligned in the main scanning direction.

After performing this main scan, the inkjet printer next executes a sub scan according to a method such as conveying the recording medium in a direction intersecting (generally orthogonal to) the main scanning direction. After completing the sub scan, the printer again performs the main scan. An image is recorded (printed) on the recording medium by repeatedly and alternately performing the main scan and sub scan.

The recording head in this inkjet printer has a piezoelectric actuator for each ejection hole. During a recording operation, drive voltages are applied to the piezoelectric actuators, deforming the piezoelectric actuators and causing a prescribed amount of ink to be ejected from the corresponding ejection holes.

With increasing demand in recent years to improve the resolution of images printed on printing materials and to increase the printing speed, efforts have been made to increase the density of the ejection holes formed in the recording head and to shorten the time interval between ink ejections.

However, if ink droplets are ejected at shorter intervals from densely arranged ejection holes, the load on each ejection hole becomes severe when the ink droplets must be ejected from all ejection holes in a single main scan. In such a case, the system may not be able to respond completely by the next main scan, making ink ejection in the next scan unstable. Specifically, ink ejection in the next main scan may be irregular due to a less than normal amount of ink being ejected or the shape of the ejected ink droplets being distorted, for example, resulting in nonuniform or improperly formed dots and, consequently, a deterioration in image quality in the printed results.

Japanese unexamined patent application publication No. 2000-218777 describes an inkjet recording apparatus having a thinning multi-pass printing mode. When printing in this mode, image data to be printed in each scan is pseudo-randomized with respect to the number of scans so as to shuffle the order in which the image data is printed. In this way, the printing apparatus reduces image noise while improving image quality.

SUMMARY

However, the results of pseudo-randomization naturally include cases in which ink droplets are ejected from all ejection holes in a single main scan. Consequently, the inkjet recording apparatus disclosed in Japanese unexamined patent application publication No. 2000-218777 does not sufficiently resolve the ejection irregularities described above.

In view of the foregoing, it is an object of the present invention to provide a recording controller for an image-forming device, and a method for controlling recording operations with the recording controller that can achieve stable ejection of ink droplets in each main scan and can record high-quality images on recording paper at a high rate of speed, even when ejecting droplets at short intervals (with a short ejection cycle).

In view of the foregoing, it is an object of the present invention to provide a recording controller for an image-forming device, and a method for controlling recording operations with the recording controller that can achieve stable ejection of ink droplets in each main scan and can record high-quality images on recording paper at a high rate of speed, even when ejecting droplets at short intervals (with a short ejection cycle).

In order to attain the above and other objects, the present invention provides an inkjet printer including a recording head, a scanning unit, and a controller. The recording head is formed with a plurality of ejection holes including a plurality of first ejection holes and a plurality of second ejection holes arranged in a first direction to eject ink droplets onto a recording medium having a plurality of virtual columns extending in the first direction and a plurality of virtual rows extending in a second direction orthogonal to the first direction. Each of the plurality of virtual columns is equally spaced in the second direction. Each of the plurality of virtual rows is equally spaced in the first direction. The plurality of virtual columns has a plurality of first virtual columns and a plurality of second virtual columns alternately arranged in the second direction. Ink droplets are ejectable from the plurality of ejection holes onto intersecting points of the plurality of virtual columns with the plurality of virtual rows. The scanning unit performs a first scan to move the recording head in the second direction, and performs, after the first scan, a second scan to move the recording head in the second direction. The plurality of ejection holes moves, in the second scan, along the plurality of virtual rows different from the plurality of virtual rows along which the plurality of ejection holes moves respectively in the first scan. The controller prevents the recording head in the first scan from ejecting ink droplets from the plurality of first ejection holes onto the plurality of first virtual columns and from the plurality of second ejection holes onto the plurality of second virtual columns, and prevents the recording head in the second scan from ejecting ink droplets from the plurality of first ejection holes onto the plurality of second virtual columns and from the plurality of second ejection holes at the plurality of first virtual columns.

Another aspect of the present invention provides a method for controlling operations using an inkjet printer including a recording head formed with a plurality of ejection holes including a plurality of first ejection holes and a plurality of second ejection holes arranged in a first direction to eject ink droplets onto a recording medium having a plurality of virtual columns extending in the first direction and a plurality of virtual rows extending in a second direction orthogonal to the first direction. Each of the plurality of virtual columns is equally spaced in the second direction. Each of the plurality of virtual rows is equally spaced in the first direction. The plurality of virtual columns has a plurality of first virtual columns and a plurality of second virtual columns alternately arranged in the second direction. Ink droplets are ejectable from the plurality of ejection holes onto intersecting points of the plurality of virtual columns with the plurality of virtual rows. The method includes performing a first scan to move the recording head in the second direction, while preventing the recording head from ejecting ink droplets from the plurality of first ejection holes onto the plurality of first virtual columns and from the plurality of second ejection holes onto the plurality of second virtual columns; and performing, after the first scan, a second scan to move the recording head in the second direction, while preventing the recording head from ejecting ink droplets from the plurality of first ejection holes onto the plurality of second virtual columns and from the plurality of second ejection holes at the plurality of first virtual columns. The plurality of ejection holes moves along the plurality of virtual rows different from the plurality of virtual rows along which the plurality of ejection holes moves respectively in the first scan.

Another aspect of the present invention provides a computer-readable storage medium storing a set of program instructions executable on an inkjet printer including a recording head formed with a plurality of ejection holes including a plurality of first ejection holes and a plurality of second ejection holes arranged in a first direction to eject ink droplets onto a recording medium having a plurality of virtual columns extending in the first direction and a plurality of virtual rows extending in a second direction orthogonal to the first direction. Each of the plurality of virtual columns is equally spaced in the second direction. Each of the plurality of virtual rows is equally spaced in the first direction. The plurality of virtual columns has a plurality of first virtual columns and a plurality of second virtual columns alternately arranged in the second direction. Ink droplets are ejectable from the plurality of ejection holes onto intersecting points of the plurality of virtual columns with the plurality of virtual rows. The set of program instructions includes performing a first scan to move the recording head in the second direction, while preventing the recording head from ejecting ink droplets from the plurality of first ejection holes onto the plurality of first virtual columns and from the plurality of second ejection holes onto the plurality of second virtual columns; and performing, after the first scan, a second scan to move the recording head in the second direction, while preventing the recording head from ejecting ink droplets from the plurality of first ejection holes onto the plurality of second virtual columns and from the plurality of second ejection holes at the plurality of first virtual columns. The plurality of ejection holes moves along the plurality of virtual rows different from the plurality of virtual rows along which the plurality of ejection holes moves respectively in the first scan.

BRIEF DESCRIPTION OF THE DRAWINGS

The particular features and advantages of the invention as well as other objects will become apparent from the following description taken in connection with the accompanying drawings, in which:

FIGS. 6(a)-6(d) are explanatory diagrams showing layouts of dots to be recorded on paper by ejection holes in each main scan (pass) according to the second embodiment;

DETAILED DESCRIPTION

Figure 1:
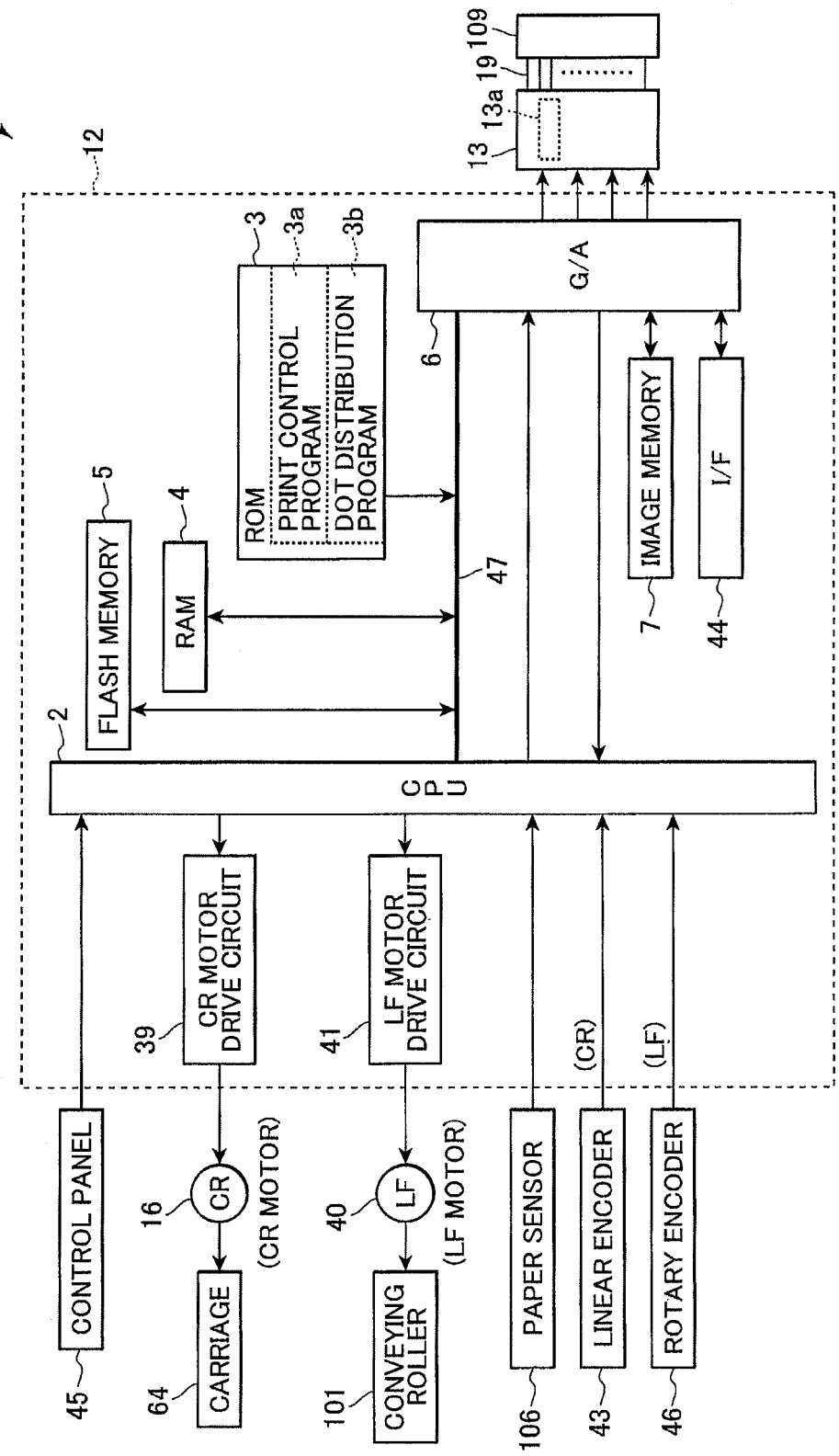
FIG. 1 is a block diagram showing a basic electrical circuit structure in a printer.
Figure 2A:
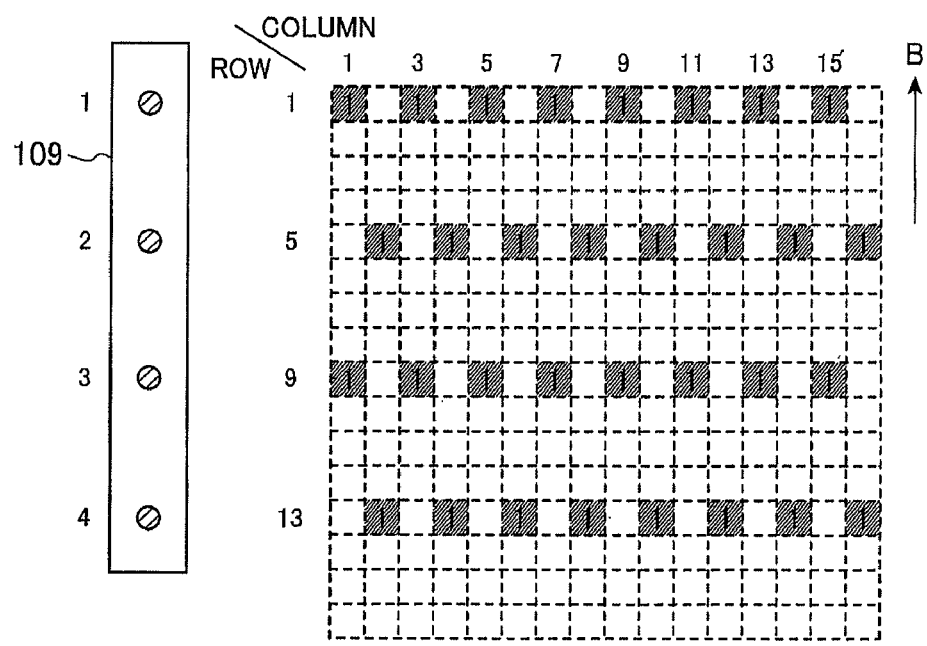
FIGS. 2(a)-2(d) are explanatory diagrams conceptually illustrating layouts of dots to be recorded on recording paper in each main scan (each pass) according to a first embodiment.
Figure 2B:
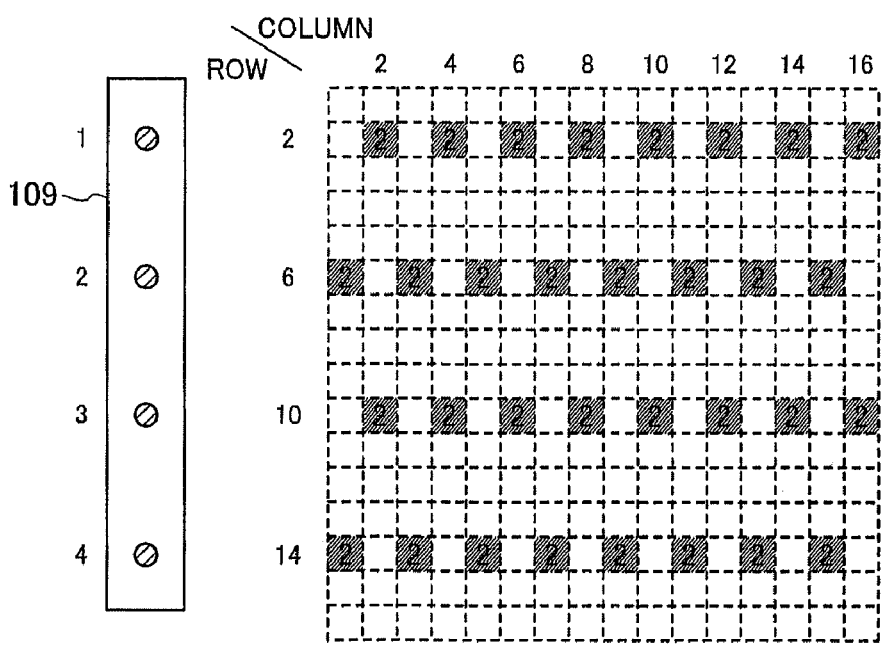
Figure 2C:
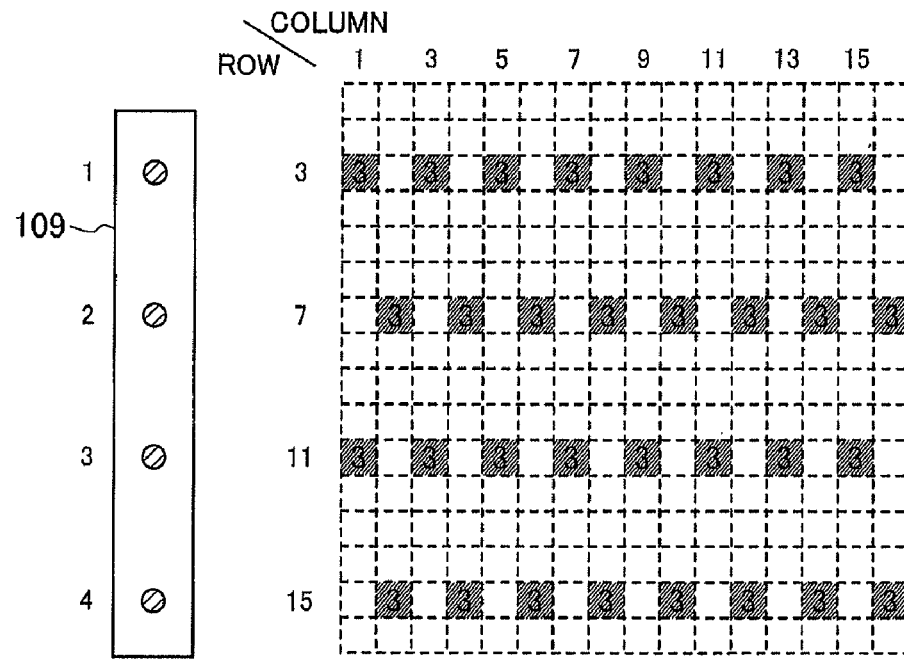
Figure 2D:
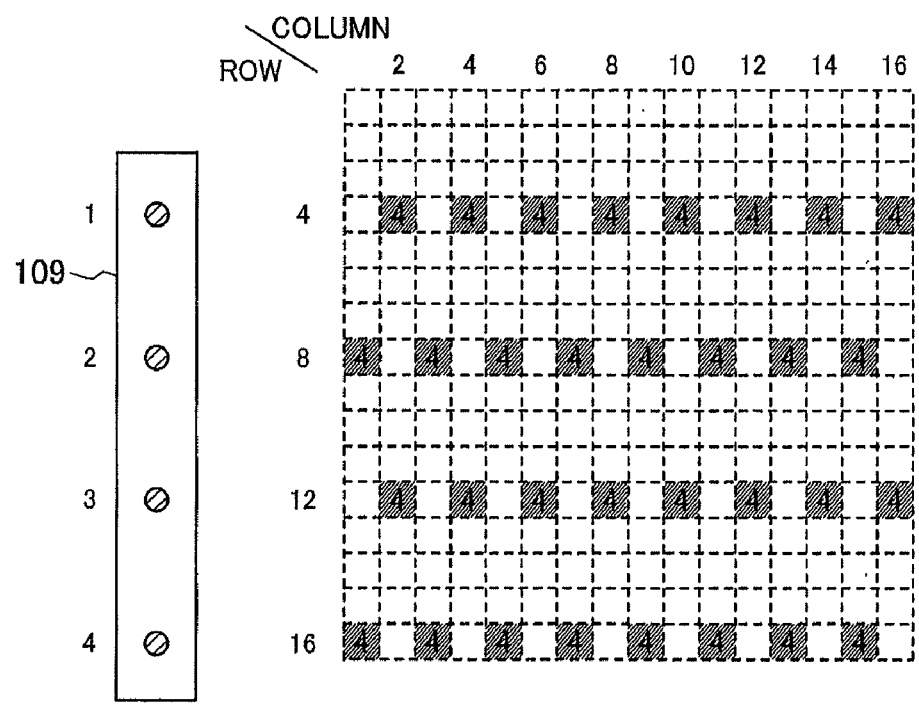

Next, a printer 1 serving as a first embodiment of a recording device according to the present invention will be described while referring to the accompanying drawings. FIG. 1 is a block diagram showing the basic electrical circuit structure in the printer 1. The printer 1 is an inkjet-type apparatus that forms color images by ejecting ink in a plurality of colors onto a recording medium.

The recording controller for controlling the printer 1 in the preferred embodiment is configured of a control circuit board 12 disposed in the body of the printer 1, and a carriage circuit board 13. As will be described later in greater detail, the control circuit board 12 performs control to avoid driving all ejection holes in a print head 109 within a single array aligned in a sub-scanning direction when recording dots in each column of a main scan. Through this control, the printer 1 according to the first embodiment can record high-quality images on recording paper at a high rate of speed.

Mounted on the control circuit board 12 are a CPU 2, a ROM 3 for storing fixed values and various control programs executed by the CPU 2, a RAM 4 for temporarily storing various data, a flash memory 5, an image memory 7, a gate array 6, and the like.

The CPU 2 processes inputted image data according to control programs stored in the ROM 3 and stores the results of the process in the image memory 7, generates print timing signals and the like, and transfers these signals to the gate array 6 described later. The CPU 2 is connected to a control panel 45 by which the user can input a print instruction and the like, a carriage motor (CR motor) drive circuit 39 for driving a CR motor 16, a line feed motor (LF motor) drive circuit 41 for driving an LF motor 40, a paper sensor 106, a linear encoder 43, and a rotary encoder 46. The CPU 2 controls each device connected thereto. The CR motor 16 functions to reciprocate a carriage 64 in a main scanning direction orthogonal to the sub-scanning direction. The print head 109 mentioned earlier is mounted in the carriage 64. The LF motor 40 functions to a drive conveying roller 101 for conveying recording paper in the sub-scanning direction.

The paper sensor 106 detects the presence of recording paper. The linear encoder 43 detects the amount of movement of the carriage 64. The CPU 2 controls reciprocating movement of the carriage 64 in the main scanning direction based on the amount of movement detected by the linear encoder 43. The rotary encoder 46 detects the amount of angular movement of the conveying rollers 101. The CPU 2 controls the conveying rollers 101 based on the amount of angular movement detected by the rotary encoder 46.

Data stored in the ROM 3 includes a print control program 3*a* for implementing a printing process, and a dot distribution program 3*b* for assigning dot positions when forming dots in each row so as to avoid cases in which a load is applied to all ejection holes (recording elements) arranged in the sub-scanning direction of the print head 109 (conveying direction of the recording paper). The flash memory 5 stores correction values and the like found in factory tests prior to shipping the product designed to correctly convey the recording paper and correctly scan the print head 109. The CPU 2, ROM 3, RAM 4, flash memory 5, and gate array 6 are interconnected via a bus line 47.

The gate array 6 transfers recording data (drive signals) for recording the image data on recording paper and a transfer clock signal for synchronizing with the recording data, and the like, to the carriage circuit board 13, based on a timing signal transferred from the CPU 2 and image data stored in the image memory 7. The gate array 6 also stores image data transferred from a personal computer, digital camera, and the like via a USB or other interface 44 in the image memory 7.

The carriage circuit board 13 applies drive voltages to piezoelectric actuators corresponding to the ejection holes formed in the print head 109. The carriage circuit board 13 has a head driver (drive circuit) 13*a* for supplying the drive voltages to the piezoelectric actuators.

The CPU 2 controls the head driver 13*a* through the gate array 6 mounted on the control circuit board 12 to apply drive voltages as needed to each piezoelectric actuator corresponding to each of the plurality of ejection holes. When a drive voltage is applied to a piezoelectric actuator, a prescribed amount of ink is ejected from the corresponding ejection hole formed in the print head 109. The head driver 13*a* and each of the piezoelectric actuators are connected to a flexible circuit board 19. The flexible circuit board 19 has a copper foil wiring pattern formed on polyimide film having a thickness of 50-150 μm.

The ejection holes are formed in the bottom surface of the print head 109, which is the surface opposing the recording paper in a printing operation. An array of ejection holes extending in the conveying direction of the recording paper (the sub-scanning direction) is provided for each color of ink. Ink colors may include cyan, magenta, yellow, blue, and black, for example. The ejection holes in each array are arranged at a prescribed pitch, such as 150 dpi. Here, the array of ejection holes corresponding to each color of ink may be linear or in a staggered arrangement. Further, one or a plurality of arrays of ejection holes may be provided for each color of ink based on the need for each color.

The print head 109 mounted in the carriage 64 reciprocates in the main scanning direction orthogonal to the direction in which the recording paper is conveyed. Further, ink cartridges (not shown) accommodating ink in each of the printing colors are connected to the print head 109 via ink tubes (not shown) for supplying ink to each of the ejection holes formed in the print head 109.

Figure 3:
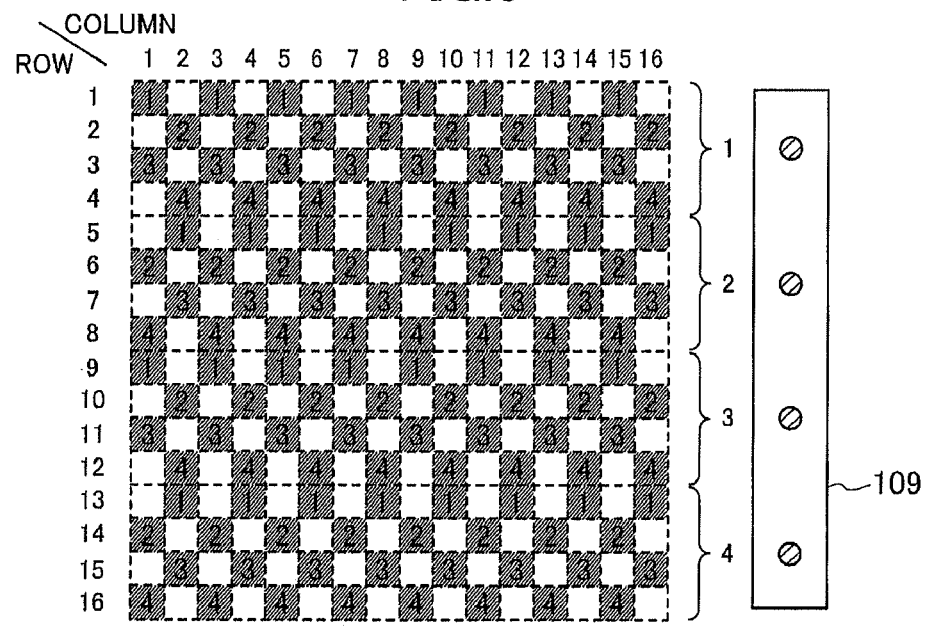
FIG. 3 is an explanatory diagram showing a layout of resulting dots ultimately formed according to the main scans shown in FIG. 2.

Next, the method of arranging dots to be formed on recording paper by the printer 1 of the preferred embodiment will be described with reference to FIGS. 2 and 3. FIG. 2 is an explanatory diagram conceptually illustrating the layout of dots to be recorded on recording paper in each main scan (each pass) of the print head. FIG. 3 is an explanatory diagram showing the layout of the resulting dots ultimately formed according to the main scans shown in FIG. 2.

As described above, a plurality (100, for example) of ejection holes is arranged in an array in the print head 109 for each color of ink. To simplify the description of the present invention, only one array of ejection holes in the print head 109 will be considered in the preferred embodiment. Accordingly, the print head 109 shown in FIGS. 2(*a*)-2(*d*) is depicted with only one array of ejection holes, the holes being indicated by circles with diagonal hatching.

A number is provided to the left of each ejection hole for identifying the hole. Specifically, the numbers are arranged in order from top to bottom in the drawings, with the top ejection hole being the first hole. For simplification, the description of the first embodiment assumes that only four ejection holes are formed in the print head 109.

Dots are arranged in positions on a grid having columns for indicating positions at regular intervals in the main scanning direction and rows indicating positions at regular intervals in the sub-scanning direction. Numbers are assigned to the columns in the order 1st column, 2nd column, etc. beginning from the left edge of the recording paper. Similarly, numbers are assigned to the rows in the order 1st row, 2nd row, etc. beginning from the top of the recording paper.

In the example of dots layouts in FIGS. 2 and 3, the printing resolution is four times the recording head resolution, i.e., the pitch of ejection holes arranged in the sub-scanning direction. Therefore, dots are arranged in a region defined by 1st through 16th columns and 1st through 16th rows, as shown in FIGS. 2 and 3. Each grid point in FIGS. 2 and 3 corresponding to one row and one column is represented by a square, and grid points with dark hatching indicate positions for forming dots. The number provided in each grid point with hatching, i.e., in each dot position represents the number of the main scan in which the dot is to be formed.

FIG. 2(*a*) shows the dot layout in the first main scan (first pass). FIG. 2(*b*) shows the dot layout in the second main scan (second pass). FIG. 2(*c*) shows the dot layout in the third main scan (third pass). FIG. 2(*d*) shows the dot layout in the fourth main scan (fourth pass).

As shown in FIG. 2(*a*), the 1st and 3rd ejection holes form dots in every odd column in the 1st and 9th rows during the first pass. In the same first pass, 2nd and 4th ejection holes form dots in every even column of the 5th and 13th rows.

In the second pass shown in FIG. 2(*b*) performed after conveying the recording paper in the sub-scanning direction B (see FIG. 2(*a*)) following the first pass, the 1st and 3rd ejection holes form dots in every even column of the 2nd and 10th rows. In the same second pass, the 2nd and 4th ejection holes form dots in every odd column of the 6th and 14th rows.

In the third pass shown in FIG. 2(*c*) performed after conveying the recording paper in the sub-scanning direction B following the second pass, the 1st and 3rd ejection holes form dots in every odd column of the 3rd and 11th rows. In the same third pass, the 2nd and 4th ejection holes form dots in every even column of the 7th and 15th rows.

In the fourth pass shown in FIG. 2(*d*) performed after conveying the recording paper in the sub-scanning direction B following the third pass, the 1st and 3rd ejection holes form dots in every even column of the 4th and 12th rows. In the same fourth pass, the 2nd and 4th ejection holes form dots in every odd column of the 8th and 16th rows.

Hence, according to the preferred embodiment, dots in each column are formed using half (50%) of the ejection holes aligned in the sub-scanning direction of the print head 109 in any one pass (hereinafter referred to as the "current pass" when referring to a specific pass). Further, different ejection holes from the ejection holes used in the current pass are used to form dots for the same respective columns in the next pass (for example, the third pass when the current pass is the second pass).

Therefore, the method in the preferred embodiment reliably avoids cases in which all ejection holes aligned in the sub-scanning direction of the print head 109 are driven to form dots in the same column, whether in the current pass or the next pass.

Hence, the method of the preferred embodiment can reduce the load per scan on the print head 109 while suppressing fluctuations in load for each scan. A particular feature of the invention is to use half (50%) of the total number of ejection holes arranged in the sub-scanning direction for each pass, thereby minimizing fluctuations in load on the ejection holes between main scans.

Hence, the present invention suppresses the occurrence of distortion in the print head 109, hysteresis in the piezoelectric actuators, and other factors caused by excessive load on the ejection holes that can lead to instability in the condition of the ejection holes, even when shortening the drive interval for the ejection holes, i.e., the period between ink ejections from each ejection hole (ejection cycle).

As a result, the invention can maintain the ejection holes in a stable state for each main scan, preventing an increase in the expected amount of ejected ink (3 picoliters, for example) and preventing distortion in the shape of the dots formed on the recording paper. In other words, the invention can prevent nonuniform or improper dot shapes, thereby preventing a drop in the quality of images recorded on recording paper and enabling high-quality images to be recorded at a high speed.

Further, in the preferred embodiment, every other ejection hole arranged in the sub-scanning direction can be used in each main scan. Therefore, it is possible not only to minimize fluctuations in load on the ejection holes for each main scan, but also to reduce the occurrence of adjacent ejection holes being driven simultaneously, thereby suppressing structural interference and more satisfactorily maintaining the ejection holes in a stable state for each main scan.

As shown in FIGS. 2(*a*)-2(*d*), dots formed in the next main scan following the current main scan are in lines between rasters formed in the current main scan (i.e., between rows configured of dots formed in the current main scan) and adjacent to each raster of the current main scan (each row formed in the current main scan). Forming rasters (dots) between rows formed in the current main scan can improve the resolution in the sub-scanning direction.

Here, each ejection hole can only form a dot in every other column for any one pass, and the columns in which each ejection hole can form dots are alternated between the current main scan and the next main scan.

In the final layout of dots shown in FIG. 3, the dots formed by each ejection hole are staggered in the sub-scanning direction between the current main scan and the next main scan. By arranging dots in this staggered formation, where dots in adjacent columns are staggered in the sub-scanning direction, white streaks (known as "banding") occurring when the sheet is conveyed farther than expected do not form a straight line. Therefore, banding is not noticeable at least in regions with staggered dots.

In the preferred embodiment, dots in the next pass are formed between rows formed in the current pass, and dots that can be formed by each ejection hole are staggered in the sub-scanning direction between the current main scan and the next main scan. Accordingly, it is possible to increase the printing resolution in the sub-scanning direction while eliminating noticeable banding, thereby recording high-quality images on the recording paper.

Figure 4:
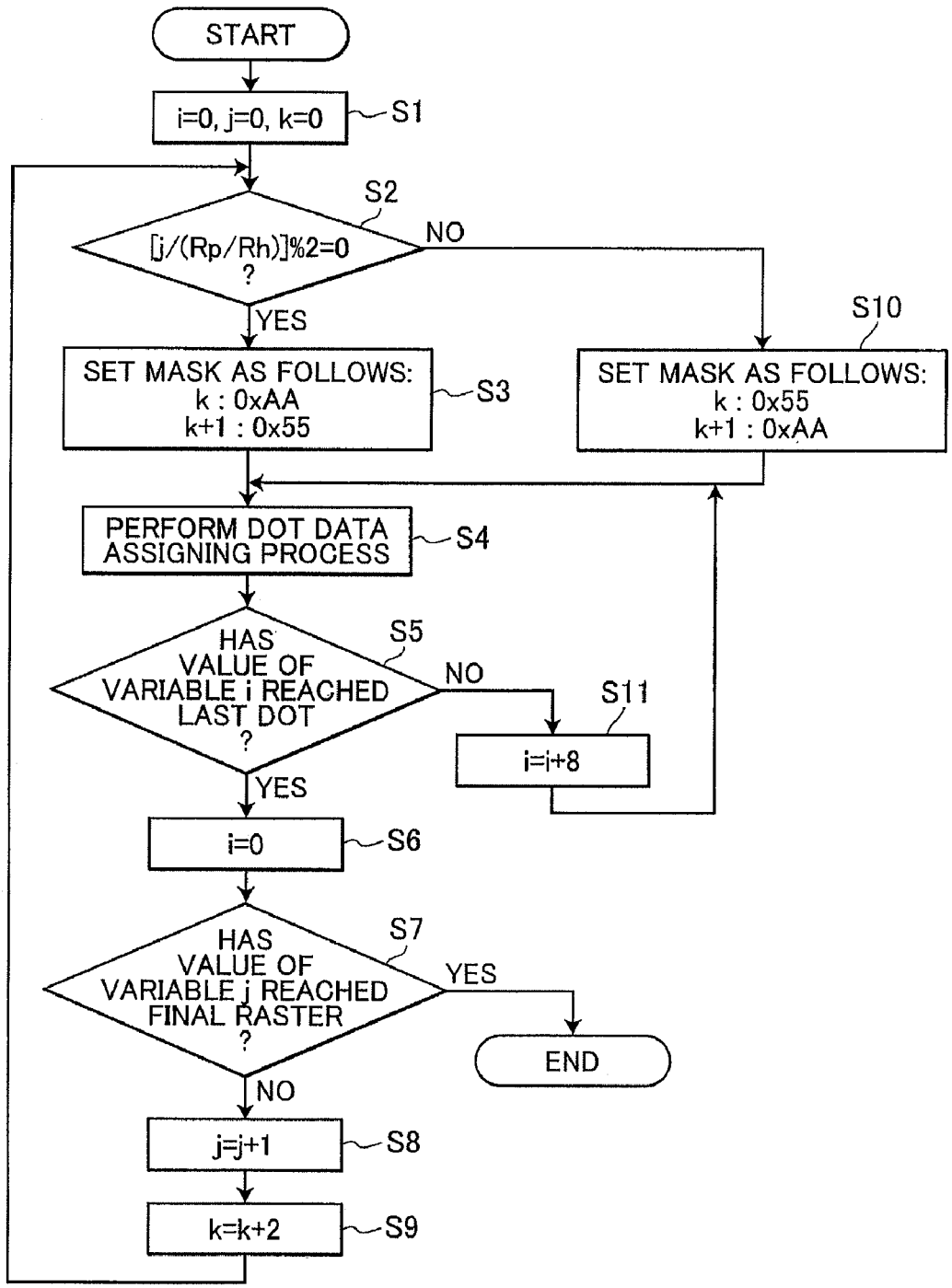
FIG. 4 is a flowchart illustrating steps in a process according to the first embodiment based on a dot distribution program.

Next, a process executed by the CPU 2 based on the dot distribution program 3*b* will be described with reference to FIG. 4. FIG. 4 is a flowchart illustrating steps in the process based on the dot distribution program 3*b*.

The process shown in FIG. 4 is performed to prevent cases in which a load is applied to all ejection holes arranged on the print head 109 in an array extending in the sub-scanning direction when forming dots (when ejecting ink) in each column. This process is performed for each page of recording paper and, thus, must be performed a plurality of times when printing a plurality of pages.

In the following description for the process shown in FIG. 4, i, j, and k are variables, and Rh and Rp are constants. Here, variable i indicates the column prior to sorting (distributing) dots, variable j indicates the raster (row) prior to sorting, and variable k indicates the raster after sorting. Rh indicates the resolution of the print head, and Rp indicates the printing resolution.

The column number is represented by variable i, where column number=i+1. As in FIGS. 2 and 3, column number 1 (i=0) is assigned to the left edge of the recording paper, and the column numbers increase in sequence toward the right edge of the recording paper. The raster number is expressed by variable j, where raster number=j+1. As in FIGS. 2 and 3, raster number 1 (j=0) is assigned to the top edge of the recording paper, and the raster numbers increase in sequence toward the bottom edge of the recording paper.

The process shown in FIG. 4 is performed when the user issues a print instruction to print desired print data. In S1 of FIG. 4, the CPU 2 initializes the variable i specifying the pre-sorted column, the variable j specifying the pre-sorted row, and the variable k specifying the post-sorted row to 0. This process sets the position in the grid to column number 1 and raster number 1.

In S2 the CPU 2 determines whether a remainder of 0 is obtained when [j/(Rp/Rh)] is divided by 2, i.e., whether [j/(Rp/Rh)] is even. Here, the symbol "[ ]" is a Gaussian symbol, and the "%" operator indicates the remainder of the division.

Regions in which [j/(Rp/Rh)] is even in the example shown in FIG. 2 are the region in which the 1st ejection hole forms dots (i.e., the region including 1st through 4th rasters) and the region in which the 3rd ejection hole forms dots (i.e., the region including the 9th through 12th rasters).

Regions in which [j/(Rp/Rh)] is odd in the example shown in FIG. 2 are the region in which the 2nd ejection hole forms dots (i.e., the region including 5th through 8th rasters) and the region in which the 4th ejection hole forms dots (i.e., the region including the 13th through 16th rasters).

If the remainder found in S2 is 0 (S2: YES), j is included in the region in which the 1st ejection hole forms dots (i.e., the region including 1st through 4th rasters) and the region in which the 3rd ejection hole forms dots (i.e., the region including the 9th through 12th rasters). In such case, then, in S3 the CPU 2 sets a mask to be applied to 8-bit dot data in the post-sorted raster k to the hexadecimal number AA ("0x" in the flowchart indicates a hexadecimal number) and sets the mask to be applied to the 8-bit dot data in the post-sorted raster k+1 to the hexadecimal number 55.

Through the process of S2 and S3, in a region where [j/(Rp/Rh)] is even, that is, the region including 1st through 4th rasters, dots are sorted so as to be formed in odd columns and not even columns when variable k is even (i.e., a raster of an odd row after sorting). On the other hand, when variable k is odd (i.e., a raster of an even row after sorting), dots are sorted so as to be formed in even columns and not odd columns.

However, if the remainder found in S2 by dividing [j/(Rp/Rh)] by 2 is not 0 (S2: NO), j is included in the region in which the 2nd ejection hole forms dots (i.e., the region including 5th through 8th rasters) and the region in which the 4th ejection hole forms dots (i.e., the region including the 13th through 16th rasters). In such case, then in S10 the CPU 2 sets the mask for the 8-bit dot data in the post-sorted raster k to the hexadecimal number 55 and sets the mask for the 8-bit dot data in the post-sorted raster k+1 to the hexadecimal number AA.

Thorough the process of S2 and S10, sorts dots in regions where [j/(Rp/Rh)] is odd, that is, the region including 5th through 8th rasters, dots are sorted so as to be formed in even columns and not odd columns when variable k is even (i.e., a raster of an odd row after sorting). On the other hand, when variable k is odd (i.e., a raster of an even row after sorting), dots are sorted so as to be formed in odd columns and not even columns.

In S4 the CPU 2 performs a dot data assigning process to multiply (perform an AND operation between) eight bits of dot data in the print data and the sorting mask set above and to store the resulting dot data in the image memory 7.

In S5 the CPU 2 determines whether the value of variable i has reached the last dot in the raster. If variable i has not reached the last dot (S5: NO), in S11 the CPU 2 increments variable i by 8 and returns to the dot data assigning process of S4 to read and convert the next 8-bit value in the raster.

However, if variable i has reached the last dot in the raster (S5: YES), in S6 the CPU 2 resets variable i to 0 and in S7 determines whether variable j specifying the raster has reached the final raster on the page.

If variable j does not indicate the last raster on the page (S7: NO), in S8 the CPU 2 increments variable j by 1, in S9 increments variable k by 2, and subsequently returns to S2 to perform the above process on the next raster.

However, if variable j does indicate the last raster on the page (S7: YES), the above process has been completed for all rasters on the page and the CPU 2 ends the dot data assigning process.

As described above, the printer 1 (control circuit board 12) according to the first embodiment avoids cases in which a load is applied to all ejection holes of a column in the print head 109 arranged in the sub-scanning direction when forming dots (ejecting ink) in each column. Accordingly, the printer 1 can maintain the ejection holes in a stable state for each main scan, preventing the formation of nonuniform or improper dots. Consequently, the printer 1 can prevent a decline in the quality of images recorded on paper and can record high quality images at a high rate of speed.

Next, a printer 1 according to the second embodiment will be described with reference to FIGS. 5 through 7. In the first embodiment described above, the printer 1 uses half of the total number of ejection holes that can be used in a single main scan simply by using every other ejection hole of a column arranged in the sub-scanning direction of the print head 109.

In the second embodiment, the printer 1 avoids cases in which a load is applied to all ejection holes of a column arranged in the sub-scanning direction of the print head 109 when forming dots in each column, while also giving consideration for the electrical paths for supplying drive voltages to the ejection holes (the drive voltage supply system). In the second embodiment, like parts and components to those in the first embodiment described above are designated with the same reference numerals to avoid duplicating description.

First, the electrical paths for supplying drive voltages to ejection holes formed in the print head 109 will be described with reference to FIG. 5. FIG. 5 is an explanatory diagram showing connection correlations between each ejection hole formed in the print head 109 and the head driver 13a.

Figure 5:
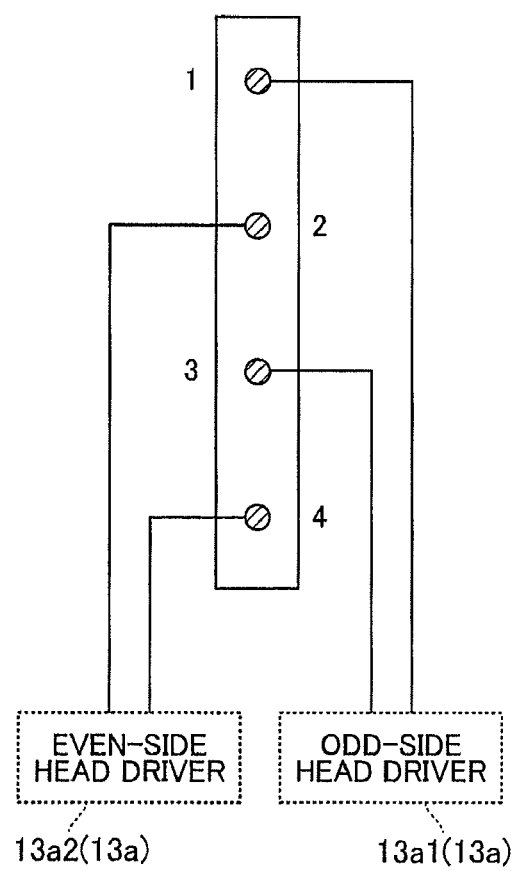
FIG. 5 is an explanatory diagram showing connection correlations between each ejection hole formed in a print head and a head driver according to a second embodiment.

As shown in FIG. 5, each odd ejection hole formed in the print head 109 is connected to an odd-side head driver 13a1, while each even ejection hole is connected to an even-side head driver 13a2.

In this way, electrical paths for supplying drive voltages to odd-numbered ejection holes are provided separately from electrical paths for supplying drive voltages to even-numbered ejection holes. Providing two systems for supplying drive voltages to the ejection holes is advantageous for running the wiring. Further, by setting similar wiring conditions for all ejection holes, the printer 1 can control all ejection holes to achieve the same characteristics.

The odd-side head driver 13a1 is part of the head driver 13a (see FIG. 1) and supplies drive voltages to the odd-numbered ejection holes. Similarly, the even-side head driver 13a2 is part of the head driver 13a and supplies drive voltages to the even-numbered ejection holes.

Next, the layout of dots to be formed on recording paper by the printer 1 according to the second embodiment will be described with reference to FIGS. 6 and 7. FIG. 6 is an explanatory diagram showing the layout of dots to be recorded on paper by ejection holes in each main scan (pass) according to the second embodiment, while FIG. 7 is an explanatory diagram showing the final layout of dots according to the second embodiment.

Figure 6A:
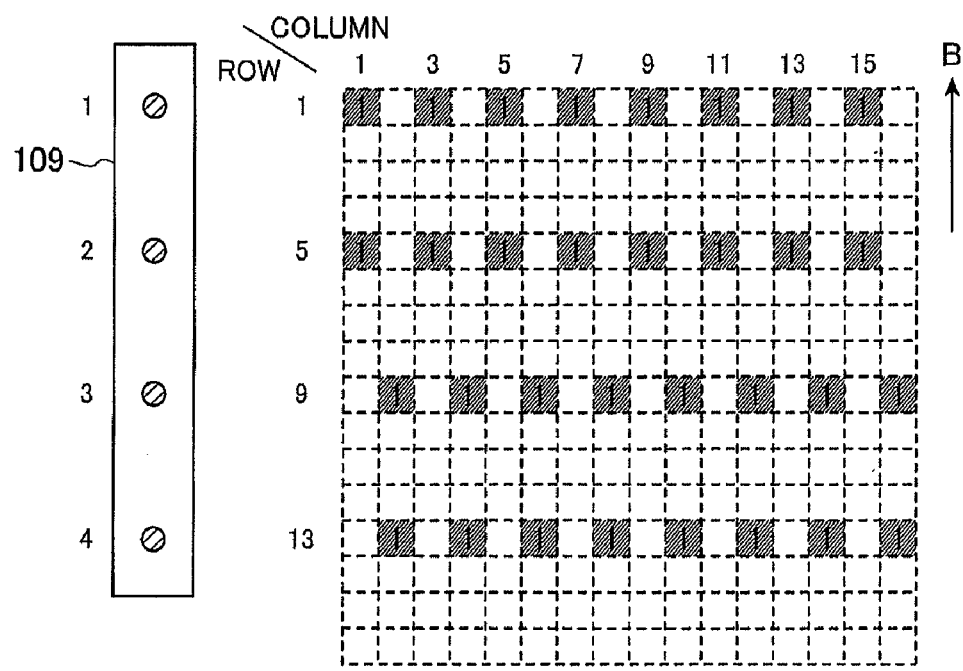
Figure 6B:
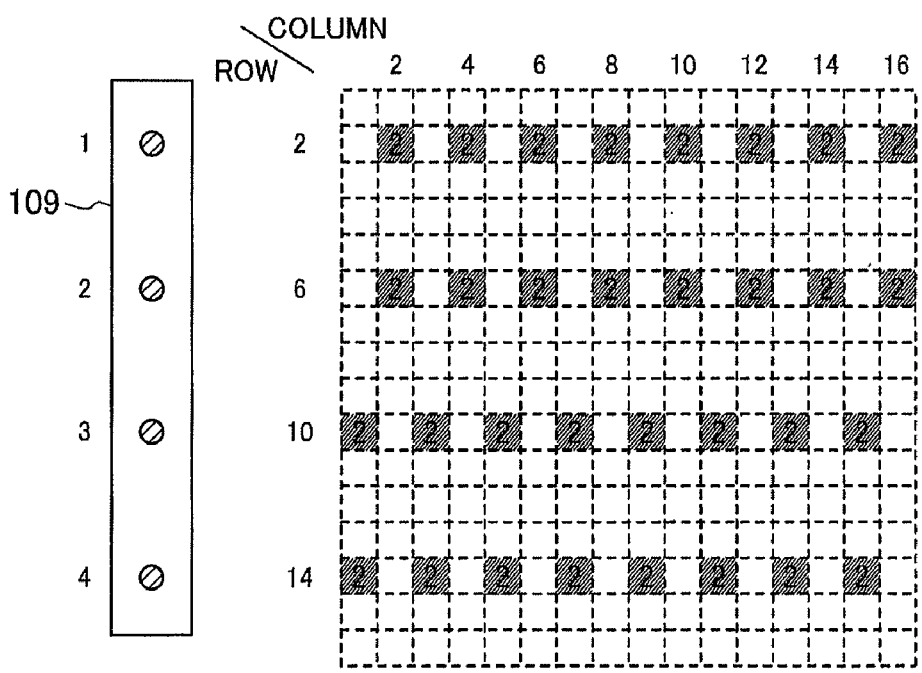
Figures 6C, 6D:
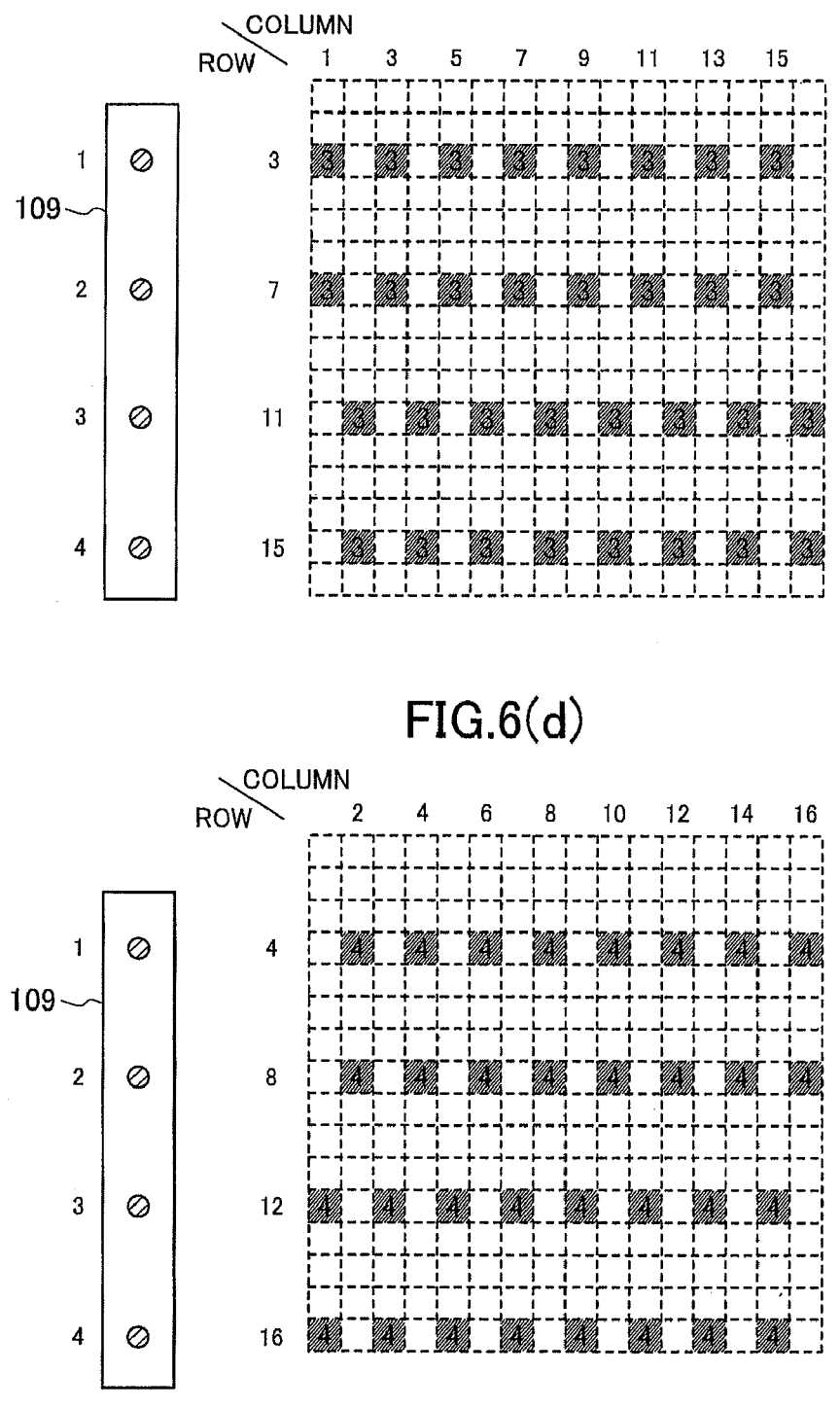

FIG. 6(a) shows the layout of dots in the first main scan (first pass). FIG. 6(b) shows the layout of dots in the second main scan (second pass). FIG. 6(c) shows the layout of dots in the third main scan (third pass). FIG. 6(d) shows the layout of dots in the fourth main scan (fourth pass).

As shown in FIG. 6(a), the 1st and 2nd ejection holes form dots in every odd column of the 1st and 5th rows in the first scan. In the same first main scan, the 3rd and 4th ejection holes form dots in every even column of the 9th and 13th rows.

As shown in FIG. 6(b), in the second main scan performed after conveying the recording paper in the sub-scanning direction B (see FIG. 6(a) following the first main scan, the 1st and 2nd ejection holes form dots in every even column of the 2nd and 6th rows. In the same second main scan, the 3rd and 4th ejection holes form dots in every odd column of the 10th and 14th rows.

As shown in FIG. 6(c), in the third main scan performed after conveying the recording paper in the sub-scanning direction B following the second main scan, the 1st and 2nd ejection holes form dots in every odd column of the 3rd and 7th rows. In the same third main scan, the 3rd and 4th ejection holes form dots in every even column of the 11th and 15th rows.

As shown in FIG. 6(d), in the fourth main scan performed after conveying the recording paper in the sub-scanning direction B following the third main scan, the 1st and 2nd ejection holes form dots in every even column of the 4th and 8th rows. In the same fourth main scan, the 3rd and 4th ejection holes form dots in every odd column of the 12th and 16th rows.

As in the first embodiment, the printer 1 according to the second embodiment arranges dots so that half (50%) of the ejection holes in the print head 109 arranged in a column in the sub-scanning direction can be used to form dots in each column for each main scan. Further, different ejection holes from the ejection holes used in the current main scan are used to form dots for the same respective columns in the next main scan (for example, the third main scan when the current main scan is the second main scan).

Therefore, as in the first embodiment, the printer 1 according to the second embodiment reliably avoids cases in which all ejection holes of an array aligned in the sub-scanning direction in the print head 109 are driven to form dots in the same column, whether in the current main scan or the next main scan.

As a result, by the same reasons as described above in the first embodiment, the printer 1 according to the second embodiment can prevent the formation of nonuniform or improper dots, even when shortening the drive interval for the ejection holes, i.e., the period between ink ejections from each ejection hole (ejection cycle). Accordingly, the printer 1 can prevent a drop in the quality of images recorded on recording paper, enabling high-quality images to be recorded at a high speed.

In addition, the printer 1 according to the second embodiment arranges dots so that 50% of the odd-numbered ejection holes (25% of the total number of ejection holes) supplied a drive voltage from the odd-side head driver 13a1 can be used to form dots in each column. Similarly, the printer 1 arranges dots so that 50% of even-numbered ejection holes (25% of the total) supplied a drive voltage from the even-side head driver 13a2 can be used to form dots in each column.

Therefore, the printer 1 according to the second embodiment reliably avoids cases in which a load is applied to all ejection holes (piezoelectric actuators) on the print head 109 arrayed in the sub-scanning direction (i.e., cases in which all ejection holes in the array are driven) when forming any column in the current main scan and the next main scan for each group of ejection holes belonging to each system (i.e., each supply system), when two systems are provided for supplying drive voltages to the ejection holes. Accordingly, the printer 1 according to the second embodiment can reduce the load per scan on each drive circuit (the odd-side head driver 13a1 and even-side head driver 13a2) driving the ejection holes, while minimizing fluctuations in load on the drive circuits in each main scan.

Hence, the printer 1 according to the second embodiment can more satisfactorily maintain the ejection holes in a stable state for each main scan, even when shortening the drive interval of the ejection holes, by giving consideration for the electrical paths for supplying drive voltages to the ejection holes. As a result, the printer 1 can more reliably prevent the formation of nonuniform or improper dots.

Further, the printer 1 according to the second embodiment sets the ejection holes that can be used in each main scan to every other ejection hole arrayed in the sub-scanning direction for each group of ejection holes belonging to a system for supplying drive voltages to the ejection holes. Hence, the printer 1 can reduce the occurrence of adjacent ejection holes being driven simultaneously, thereby suppressing structural interference and more satisfactorily maintaining the ejection holes in a stable state for each main scan.

As shown in FIG. 6(a)-6(d), dots formed in the next main scan are in lines between rasters formed in the current main scan and adjacent to each raster of the current main scan. Forming rasters (dots) between rows formed in the current main scan can improve the resolution in the sub-scanning direction.

Figure 7:
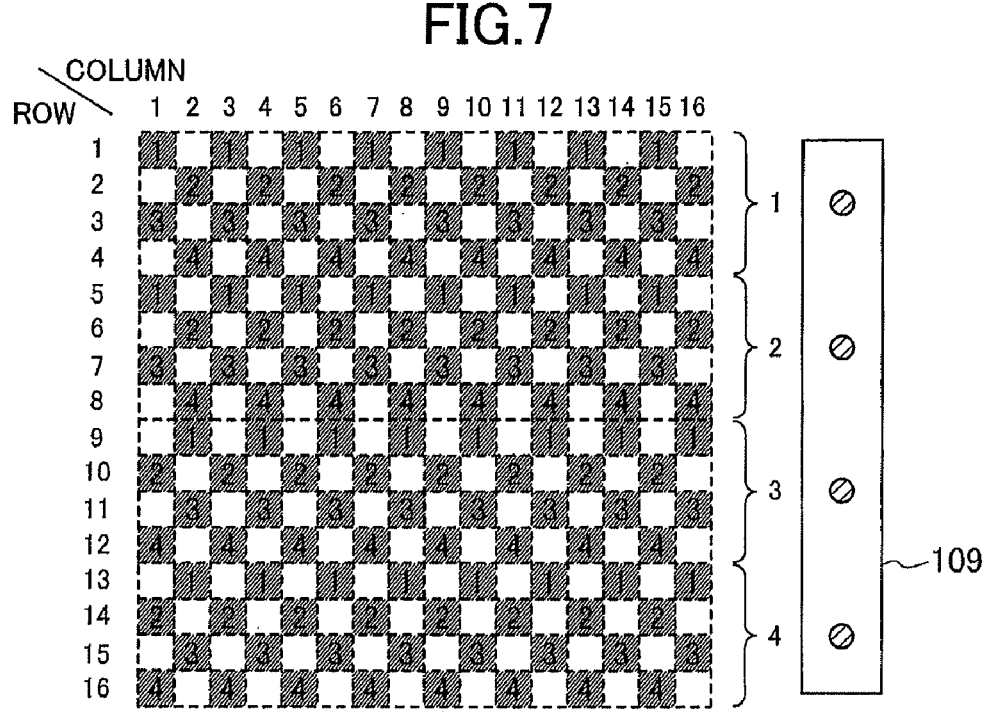
FIG. 7 is an explanatory diagram showing a layout of a resulting dots ultimately formed according to the main scans shown in FIGS. 6(a)-6(d)

In the final layout of dots shown in FIG. 7, dots formed by each ejection hole in the current main scan and the next main scan are staggered in the sub-scanning direction. By arranging dots in this staggered-formation, white streaks ("banding") occurring when the sheet is conveyed farther than expected do not form a straight line. Therefore, banding is not noticeable at least in regions with staggered dots, enabling the printer 1 to record high-quality images on recording paper.

Figure 8:
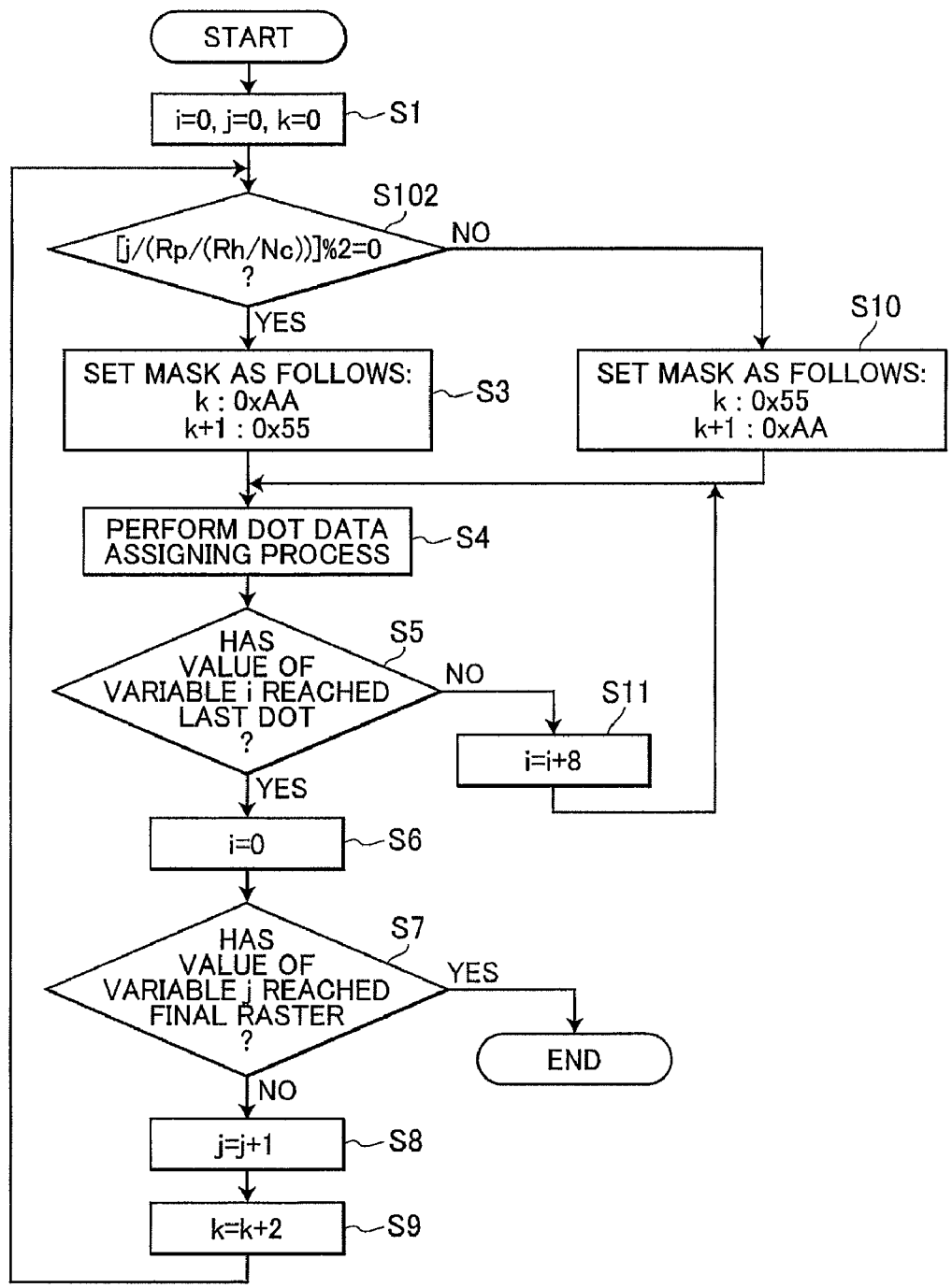
FIG. 8 is a flowchart illustrating steps in a process according to the second embodiment based on a dot distribution program.

Next, a process executed by the CPU 2 based on the dot distribution program 3b according to the second embodiment will be described with reference to FIG. 8. FIG. 8 is a flowchart illustrating steps in the process based on the dot distribution program 3b.

The process executed based on the dot distribution program 3b according to the second embodiment is achieved by modifying S2 in the process of FIG. 4 described in the first embodiment to S102 described below.

The process in FIG. 8 is performed when the user issues a print instruction to print desired print data. In S1 of FIG. 8, the CPU 2 initializes the variable i specifying the pre-sorted column, the variable j specifying the pre-sorted row, and the variable k specifying the post-sorted row to 0.

In S102 the CPU 2 determines whether a remainder of 0 is obtained when [j/(Rp/(Rh/Nc))] is divided by 2, i.e., whether [j/(Rp/(Rh/Nc))] is even. In S102 Rh denotes the print head resolution, Rp the printing resolution, and Nc the number of systems for supplying drive voltages to the ejection holes. Using the example shown in FIG. 5, Nc=2. The symbol "[ ]" is a Gaussian symbol, and the "%" operator indicates the remainder of the division.

Regions in which [j/(Rp/(Rh/Nc))] is even in the example shown in FIG. 7 are the region in which the 1st ejection hole forms dots (i.e., the region including 1st through 4th rasters) and the region in which the 2nd ejection hole forms dots (i.e., the region including the 5th through 8th rasters).

Regions in which [j/(Rp/(Rh/Nc))] is odd in the example shown in FIG. 7 are the region in which the 3rd ejection hole forms dots (i.e., the region including 9th through 12th rasters) and the region in which the 4th ejection hole forms dots (i.e., the region including the 13th through 16th rasters).

If the remainder found in S102 is 0 (S102: YES), in S3 the CPU 2 sets a mask to be applied to 8-bit dot data in the post-sorted raster k to the hexadecimal number AA and sets the mask to be applied to the 8-bit dot data in the post-sorted raster k+1 to the hexadecimal number 55.

Through the process of S102 and S3, dots are sorted in a region where [j/(Rp/(Rh/Nc))] is even so as to be formed in odd columns and not even columns when variable k is even (i.e., a raster of an odd row after sorting). On the other hand, when variable k is odd (i.e., a raster of an even row after sorting), dots are sorted so as to be formed in even columns and not odd columns.

However, if the remainder found in S102 by dividing [j/(Rp/(Rh/Nc))] by 2 is not 0 (S102: NO), then in S10 the CPU 2 sets the mask for the 8-bit dot data in the post-sorted raster k to the hexadecimal number 55 and sets the mask for the 8-bit dot data in the post-sorted raster k+1 to the hexadecimal number AA.

Thorough the process of S102 and S10, sorts dots in regions where [j/(Rp/(Rh/Nc))] is odd so that dots are formed in even columns and not odd columns when variable k is even (i.e., when k indicates a raster of an odd row after sorting). On the other hand, when variable k is odd (i.e., a raster of an even row after sorting), dots are sorted so as to be formed in odd columns and not even columns.

In S4 the CPU 2 performs the dot data assigning process described in the first embodiment. In S5 the CPU 2 determines whether the value of variable i has reached the last dot in the raster. If variable i has not reached the last dot (S5: NO), in S11 the CPU 2 increments variable i by 8 and returns to the dot data assigning process of S4 to read and convert the next 8-bit value in the raster.

However, if variable i has reached the last dot in the raster (S5: YES), in S6 the CPU 2 resets variable i to 0 and in S7 determines whether variable j specifying the raster has reached the final raster on the page.

If variable j does not indicate the last raster on the page (S7: NO), in S8 the CPU 2 increments variable j by 1, in S9 increments variable k by 2, and subsequently returns to S102 to perform the above process on the next raster.

However, if variable j does indicate the last raster on the page (S7: YES), the above process has been completed for all rasters on the page and the CPU 2 ends the dot data assigning process.

As described above, the printer 1 (control circuit board 12) according to the second embodiment avoids cases in which a load is applied to all ejection holes belonging to each supply system when forming dots (ejecting ink) in each column, with consideration for the electrical paths for supplying drive voltages to the ejection holes (supply systems). Accordingly, the printer 1 can more satisfactorily maintain the ejection holes in a stable state for each main scan, more reliably preventing the formation of nonuniform or improper dots. Consequently, the printer 1 can more reliably prevent a decline in the quality of images recorded on paper and can record high quality images at a high rate of speed.

The paths for supplying ink to the ejection holes are also often constructed in different systems between odd-numbered ejection holes and even-numbered ejection holes, as in the electrical paths for supplying drive voltages to the ejection holes (supply systems). In this case, the method of arranging dots described in the second embodiment may also serve to stabilize the supply of ink to each ejection hole, contributing to an improvement in the quality of images recorded on paper.

Although the present invention has been described with respect to specific embodiments, it will be appreciated by one skilled in the art that a variety of changes may be made without departing from the scope of the invention.

For example, in the first embodiment described above, half (50%) of all ejection holes arranged linearly in the sub-scanning direction of the print head 109 can be used for forming dots in each column. However, the ratio of ejection holes that can be used in alternating columns is not limited to 50%, but may differ among adjacent columns by a small number (1 or 2, for example).

Cases in which a load is applied to all ejection holes arranged in a column of the print head 109 in the sub-scanning direction when forming dots in a single column can be reliably avoided by using only a portion of all ejection holes arranged in the sub-scanning direction, such as a ratio of 40:60 for ejection holes that can be used in dot formation for each column to ejection holes that can be used.

Similarly, in the second embodiment described above, the number of ejection holes that can be used in each main scan is set to 50% of the ejection holes included in each group of ejection holes belonging to each system for supplying drive voltages to the ejection holes (25% of all ejection holes). However, the ratio of ejection holes that can be used for dot formation in each column to ejection holes that can be used is not limited to 50% each for each group, but may differ by a small number of ejection holes (1 or 2, for example). The ratio may also be set to 40:50 or the like.

The preferred embodiments described above give examples of dot arrangements when the printing resolution is four times the print head resolution. However, the relationship between the printing resolution an the print head resolution is not limited to a multiple of four, but may be another multiple, provided that the multiple is an integer.

In the preferred embodiments described above, dots are arranged in the regions shown in FIGS. 2, 3, 6, and 7 configured of 1st through 16th columns and 1st through 16th rows, but the numbers of columns and rows is not particularly limited.

In the second embodiment described above, the number of supply systems (denoted by Nc) for supplying drive voltages to ejection holes in the print head 109 is set to 2, but this variable may take on a variety of numbers based on the configuration of the printer 1. For example, if the ejection holes extending in the sub-scanning direction of the print head 109 are arranged in n sets of, staggered columns, i.e., 2n columns, Nc=2n when dividing the supply systems into n for each column. The value of Nc may also be odd. In the first embodiment Nc=1.

In the preferred embodiments described above, if the remainder found by dividing [j/(Rp/Rh)] or [j/(Rp/(Rh/Nc))] by 2 is 0, then the printer 1 sets the mask for the post-sorted raster k to the hexadecimal number AA and sets the mask for the post-sorted raster k+1 to the hexadecimal number 55. However, if the remainder found by dividing [j/(Rp/Rh)] or [j/(Rp/(Rh/Nc))] by 2 is not 0, then the printer 1 sets the mask for the post-sorted raster k to the hexadecimal number AA and sets the mask for the post-sorted raster k+1 to the hexadecimal number 55. However, it is also possible to set the mask for the post-sorted raster k to the hexadecimal number AA and the mask for the post-sorted raster k+1 to the hexadecimal number 55 when a remainder of 0 is found by dividing [j/(Rp/Rh)] or [j/(Rp/(Rh/Nc))] by 2 and to the mask for the post-sorted raster k to the hexadecimal number 55 and the mask for the post-sorted raster k+1 to the hexadecimal number AA when a non-zero remainder is found by dividing [j/(Rp/Rh)] or [j/(Rp/(Rh/Nc))] by 2.

In the preferred embodiments described above, the control circuit board 12 is used as an example of the recording controller according to the present invention. However, the recording controller that implements the processes shown in the flowcharts of FIGS. 4 and 7 may be provided in a device separate from the printer 1, such as a personal computer or a printer server.

Further, while the present invention is applied to an inkjet printer in the preferred embodiments, the present invention may similarly be applied to a multifunction peripheral, facsimile machine, or similar device.

Further, the recording medium printed in the preferred embodiments is formed of paper, but the recording medium may be formed of a material other than paper, such as cloth or vinyl.

What is claimed is:

1. An inkjet printer comprising:
a recording head formed with a plurality of ejection holes including a plurality of first ejection holes and a plurality of second ejection holes arranged in a first direction to eject ink droplets onto a recording medium having a plurality of invisible columns extending in the first direction and a plurality of invisible rows extending in a second direction orthogonal to the first direction, each of the plurality of invisible columns being equally spaced in the second direction, each of the plurality of invisible rows being equally spaced in the first direction, the plurality of invisible columns having a plurality of first invisible columns and a plurality of second invisible columns alternately arranged in the second direction, ink droplets being ejectable from the plurality of ejection holes onto intersecting points of the plurality of invisible columns with the plurality of invisible rows;

a scanning unit configured to perform a first scan to move the recording head in the second direction, and configured to perform, after the first scan, a second scan to move the recording head in the second direction, the plurality of ejection holes moving, in the second scan, along the plurality of invisible rows different from the plurality of invisible rows along which the plurality of ejection holes moves respectively in the first scan; and a controller configured to prevent the recording head in the first scan from ejecting ink droplets from the plurality of first ejection holes onto the plurality of first invisible columns and from the plurality of second ejection holes onto the plurality of second invisible columns, and configured to prevent the recording head in the second scan from ejecting ink droplets from the plurality of first ejection holes onto the plurality of second invisible columns and from the plurality of second ejection holes at the plurality of first invisible columns.

2. The inkjet printer according to claim 1, wherein both the plurality of first ejection holes and the plurality of second ejection holes are supplied with a driving power from a common power source.

3. The inkjet printer according to claim 2, wherein a number of the plurality of first ejection holes is equal to a number of the plurality of second ejection holes.

4. The inkjet printer according to claim 3, wherein the plurality of first ejection holes and the plurality of second ejection holes are alternately arranged in the first direction.

5. A method for controlling operations using an inkjet printer including a recording head formed with a plurality of ejection holes including a plurality of first ejection holes and a plurality of second ejection holes arranged in a first direction to eject ink droplets onto a recording medium having a plurality of invisible columns extending in the first direction and a plurality of invisible rows extending in a second direction orthogonal to the first direction, each of the plurality of invisible columns being equally spaced in the second direction, each of the plurality of invisible rows being equally spaced in the first direction, the plurality of invisible columns having a plurality of first invisible columns and a plurality of second invisible columns alternately arranged in the second direction, ink droplets being ejectable from the plurality of ejection holes onto intersecting points of the plurality of invisible columns with the plurality of invisible rows, the method comprising:

performing a first scan to move the recording head in the second direction, while preventing the recording head from ejecting ink droplets from the plurality of first ejection holes onto the plurality of first invisible columns and from the plurality of second ejection holes onto the plurality of second invisible columns; and performing, after the first scan, a second scan to move the recording head in the second direction, while preventing the recording head from ejecting ink droplets from the plurality of first ejection holes onto the plurality of second invisible columns and from the plurality of second ejection holes at the plurality of first invisible columns, the plurality of ejection holes moving along the plurality of invisible rows different from the plurality of invisible rows along which the plurality of ejection holes moves respectively in the first scan.

6. The method according to claim 5, wherein both the plurality of first ejection holes and the plurality of second ejection holes are supplied with a driving power from a common power source.

7. The method according to claim 6, wherein a number of the plurality of first ejection holes is equal to a number of the plurality of second ejection holes.

8. The method according to claim 7, wherein the plurality of first ejection holes and the plurality of second ejection holes are alternately arranged in the first direction.

9. A computer-readable storage medium storing a set of program instructions executable on an inkjet printer including a recording head formed with a plurality of ejection holes including a plurality of first ejection holes and a plurality of second ejection holes arranged in a first direction to eject ink droplets onto a recording medium having a plurality of invisible columns extending in the first direction and a plurality of invisible rows extending in a second direction orthogonal to the first direction, each of the plurality of invisible columns being equally spaced in the second direction, each of the plurality of invisible rows being equally spaced in the first direction, the plurality of invisible columns having a plurality of first invisible columns and a plurality of second invisible columns alternately arranged in the second direction, ink droplets being ejectable from the plurality of ejection holes onto intersecting points of the plurality of invisible columns with the plurality of invisible rows, the set of program instructions comprising:

performing a first scan to move the recording head in the second direction, while preventing the recording head from ejecting ink droplets from the plurality of first ejection holes onto the plurality of first invisible columns and from the plurality of second ejection holes onto the plurality of second invisible columns; and performing, after the first scan, a second scan to move the recording head, while preventing the recording head from ejecting ink droplets from the plurality of first ejection holes onto the plurality of second invisible columns and from the plurality of second ejection holes at the plurality of first invisible columns, the plurality of ejection holes moving along the plurality of invisible rows different from the plurality of invisible rows along which the plurality of ejection holes moves respectively in the first scan.

10. The inkjet printer according to claim 9, wherein both the plurality of first ejection holes and the plurality of second ejection holes are supplied with a driving power from a common power source.

11. The inkjet printer according to claim 10, wherein a number of the plurality of first ejection holes is equal to a number of the plurality of second ejection holes.

12. The inkjet printer according to claim 11, wherein the plurality of first ejection holes and the plurality of second ejection holes are alternately arranged in the first direction.

* * * * *